United States Patent
Lakshmanamurthy et al.

(10) Patent No.: US 7,308,526 B2
(45) Date of Patent: Dec. 11, 2007

(54) MEMORY CONTROLLER MODULE HAVING INDEPENDENT MEMORY CONTROLLERS FOR DIFFERENT MEMORY TYPES

(75) Inventors: Sridhar Lakshmanamurthy, Sunnyvale, CA (US); Alpesh B. Oza, Sunnyvale, CA (US); Rohit R. Verma, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 364 days.

(21) Appl. No.: 10/860,549

(22) Filed: Jun. 2, 2004

(65) Prior Publication Data

US 2005/0273564 A1 Dec. 8, 2005

(51) Int. Cl.
*G06F 12/00* (2006.01)
(52) U.S. Cl. .................. 711/104; 711/154; 711/202
(58) Field of Classification Search ............... 711/158, 711/104, 105, 5, 154, 163, 202, 169; 713/310, 713/313
See application file for complete search history.

(56) References Cited

U.S. PATENT DOCUMENTS

| | | | |
|---|---|---|---|
| 5,421,000 A * | 5/1995 | Fortino et al. | 711/118 |
| 6,457,095 B1 * | 9/2002 | Volk | 711/105 |
| 7,043,494 B1 * | 5/2006 | Joshi et al. | 707/101 |
| 2001/0015905 A1 * | 8/2001 | Kim et al. | 365/51 |
| 2003/0056061 A1 * | 3/2003 | Sherman | 711/131 |
| 2003/0206478 A1 * | 11/2003 | Ayukawa et al. | 365/230.03 |
| 2005/0216667 A1 * | 9/2005 | Cabot et al. | 711/118 |
| 2005/0240745 A1 * | 10/2005 | Iyer et al. | 711/167 |

* cited by examiner

*Primary Examiner*—Pierre-Michel Bataille
(74) *Attorney, Agent, or Firm*—Fish & Richardson P.C.

(57) ABSTRACT

A memory controller module that includes a memory interface and at least two memory controllers, each memory controller to control a category of memory devices. A circuitry enables the at least two memory controllers to control access to memory devices based on information indicating the category or categories of the memory devices coupled to the memory interface.

24 Claims, 10 Drawing Sheets

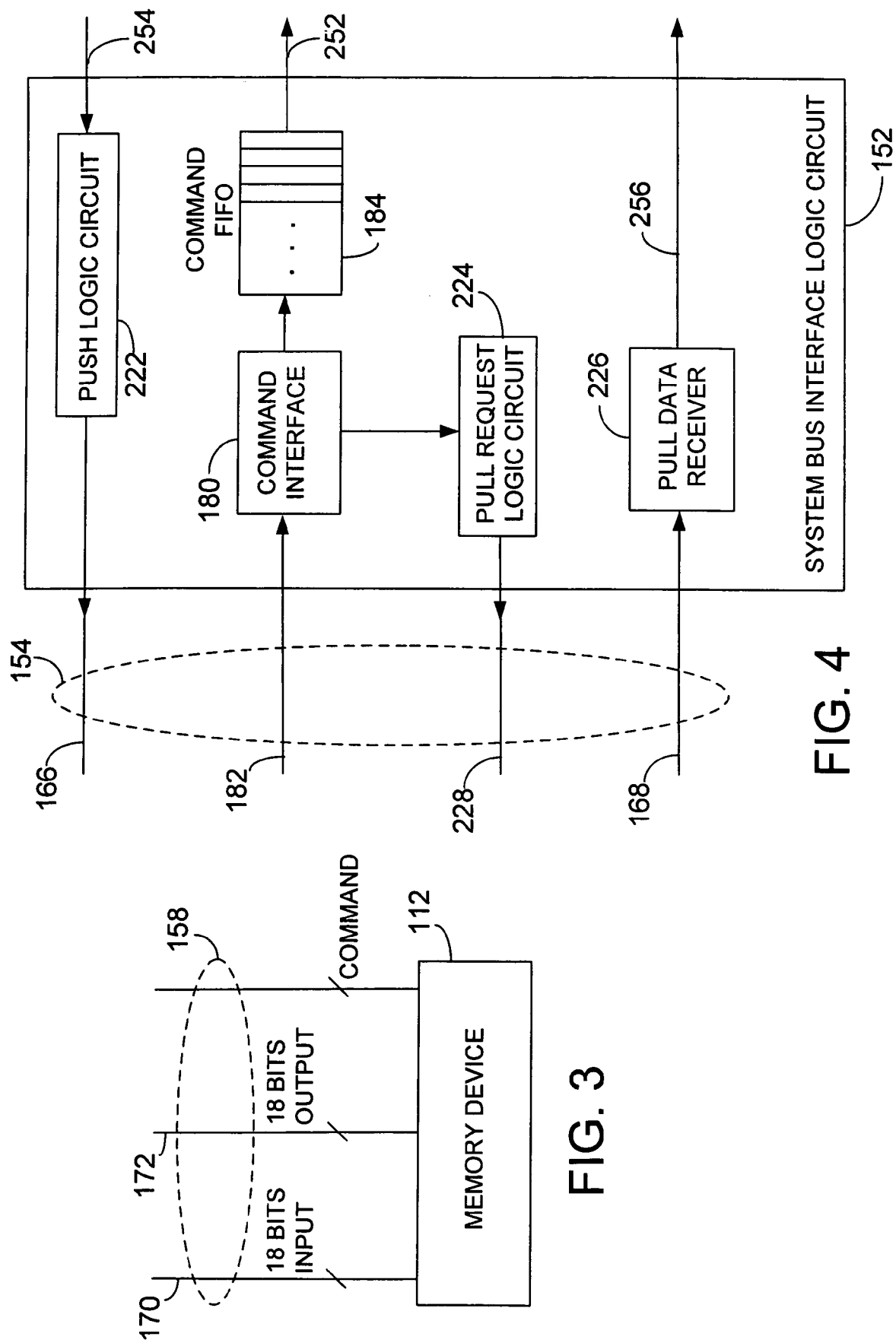

MEMORY CONTROLLER MODULE HAVING INDEPENDENT MEMORY CONTROLLERS FOR DIFFERENT MEMORY TYPES

BACKGROUND

A quad-data-rate static random access memory (QDR™ SRAM) device has separate data input and data output buses that operate simultaneously. Each data bus can operate on two words of data per clock cycle, doubling its data rate. Because both buses operate in parallel, the device can operate on four bus widths of data per clock cycle. The QDR SRAM device can operate in burst-of-two or burst-of-four modes. In the burst-of-two mode, each read/write command causes data having twice the bus width to be read from or written to the memory device. In the burst-of-four mode, each read/write command causes data having four times the bus width to be read from or written to the memory device.

A low latency dynamic random access memory (DRAM) device has circuitry to reduce latency, i.e., reduce the time between the beginning of the access cycle and the availability of data. Low latency DRAM devices include reduced latency DRAM (RLDRAM™) devices and fast cycle RAM (FCRAM™) devices, both operating with double data rate interfaces. These memory devices can have multiple internal memory banks that provide higher bandwidths while still allowing random access within each bank.

QRD SRAM and low latency DRAM devices are often used in network applications. For example, they can be used for storing lookup tables and network control information. The QDR SRAM, RLDRAM, and FCRAM devices have different structures, different pin assignments, and require different timing requirements for read/write access of data.

DESCRIPTION OF DRAWINGS

FIG. 3 shows a memory device and a memory interface

FIG. 4 shows a block diagram of a system bus interface logic circuit.

DETAILED DESCRIPTION

Network Processor

Figure 1:
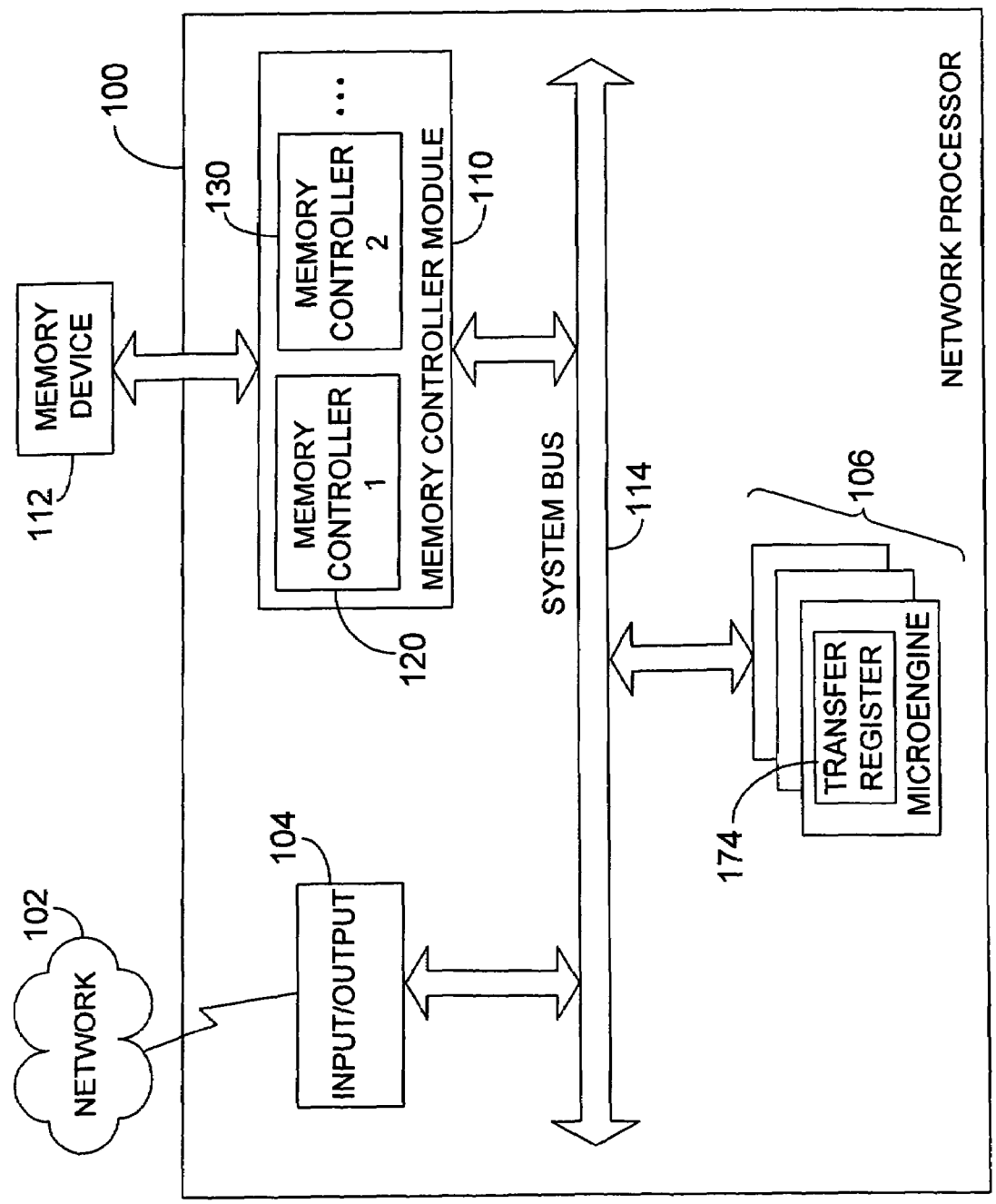
FIG. 1 shows a block diagram of a network processor that includes a memory controller module.

Referring to FIG. 1, a network processor 100 processes data packets transferred to and from a network 102 through an input/output interface 104. The network processor 100 includes a plurality of microengines 106 working in parallel to process the data packets. A memory controller module 110 controls access to a memory device 112. The microengines 106 send system commands to the memory controller module 110 through a system bus 114, the system commands requesting access to the memory device 112, such as reading data from or writing data to the memory.

The memory controller module 110 processes the system commands and generates memory commands that are sent to the memory device 112. The memory controller module 110 has at least two independent memory controllers (e.g., 120 and 130) configured to control different categories (or types) of memory devices. In one example, one memory controller controls SRAM memory devices, and another memory controller controls DRAM memory devices. The SRAM memory devices can be QDR SRAM memory devices, and the DRAM devices can be low latency DRAM devices. Depending on the category of the memory device 112, the corresponding memory controller is enabled to control access to the memory device 112. This provides flexibility to a user in choosing which category of memory device to use.

In one example, the memory controller module 110 provides access to small memory units, and supports access to QDR SRAM devices with burst-of-two data transfers. This allows the network processor 100 to read (or write) small units of data from (or to) the memory device 112. The memory device 112 can be a high speed memory device that stores control information, which tends to have many small data structures such as queue descriptors and linked lists.

The system commands are sent through the system bus 114 and follow protocols of the network processor 100, including bit length and timing requirements. The system commands include system read commands that request data to be read from the memory device 112, and system write commands that write data to the memory device 112. The memory commands follow protocols of the memory device 112, including bit length and timing requirements. The memory commands include memory read commands that can be accepted by the memory device 112, which, in response, outputs read data from specified memory addresses. The memory commands include memory write data commands that can be accepted by the memory device 112, which, in response, stores write data at specified addresses. The memory controller module 110, in response to the same system command, may generate different memory commands based on the category of memory device 112 that is currently used.

Memory Controller Module

Figure 2:
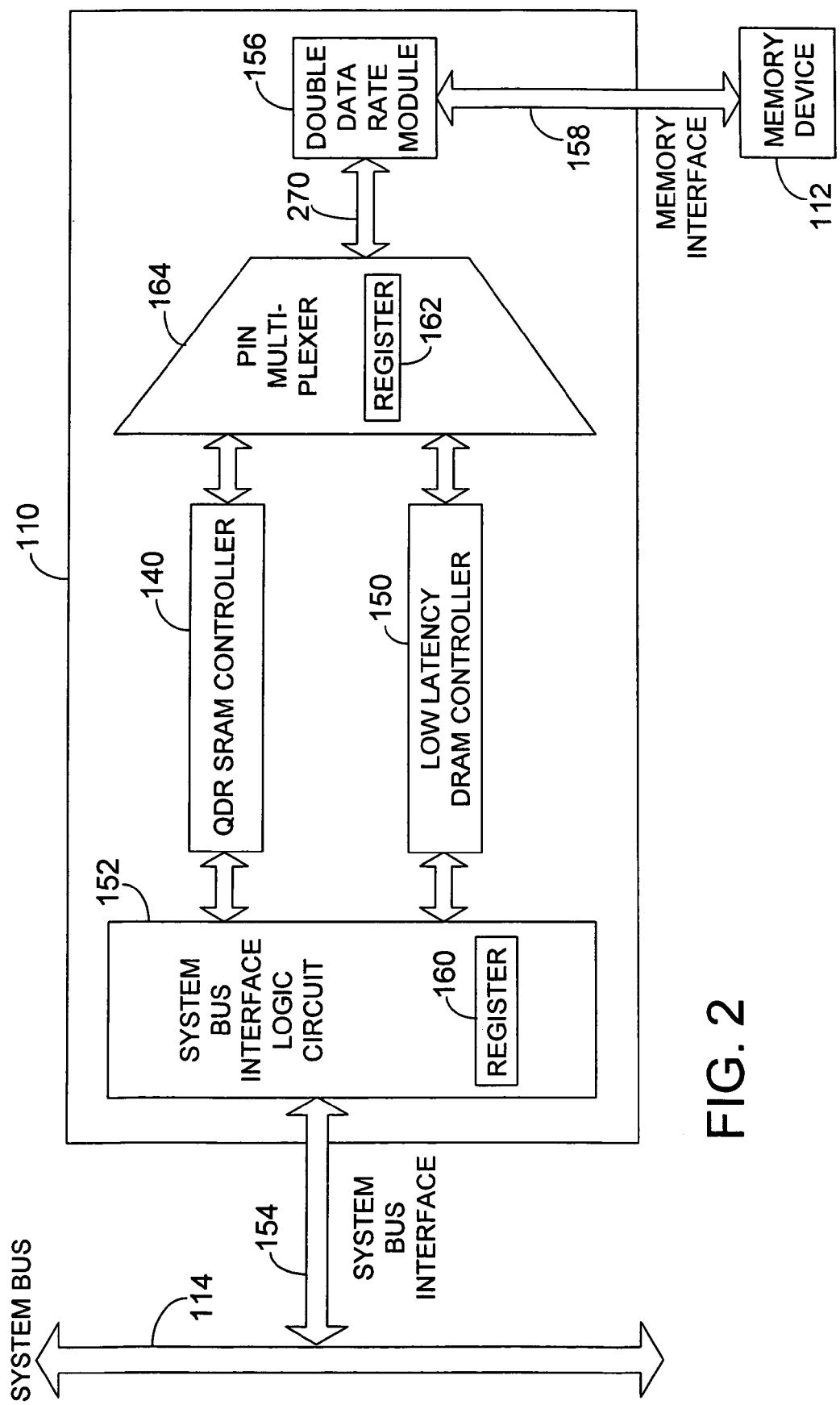
FIG. 2 shows a block diagram of a memory controller module having a QDR SRAM controller and a low latency DRAM controller.

FIG. 2 shows an example of the memory controller module 110. Module 110 includes a QDR SRAM controller 140 and a low latency DRAM controller 150 to control access to a memory device 112, which can be either a QDR SRAM device or a low latency DRAM device. A system bus interface logic circuit 152 couples the controller 140 or the controller 150 to the system bus 114 through a system bus interface 154. A pin multiplexer 164 connects the pins of the controller 140 or the controller 150 to signal lines of a data bus 270, which is coupled to a double data rate module 156.

The double data rate module 156 converts parallel data input/output signals from the memory controller into serial data input/output signals, and doubles the data transfer rate by initiating data transfers on both the rising edge and falling edge of a clock signal. The double data rate module 156 is coupled to the memory device 112 through a memory interface 158.

The memory controller module 110 allows a user to use either a QDR SRAM device or a low latency DRAM device for the memory device 112. QDR SRAM devices were commercially available earlier than low latency DRAM devices, and there are existing systems designed to work with QDR SRAM devices. The memory controller module 110 allows conventional systems to continue to use QDR SRAM devices or to use the newer low latency DRAM devices, without making changes to other system resources. Benefits of using low latency DRAM devices include lower costs and higher memory capacities.

The interface logic circuit 152 and the pin multiplexer 164 each includes a register, 160 and 162, respectively, that stores information on what category (or type) of memory (e.g., QDR SRAM or low latency DRAM) is coupled to the controller module 110. Based on the information in the register 160, the interface logic 152 forwards the memory access commands to one of the memory controllers 140 and 150. Based on the information in the register 162, the pin multiplexer 164 connects the pins of one of the memory controllers 140 and 150 to the signal lines of the data bus 270.

The system bus 114 includes data buses and command buses. The data buses transfer data between different modules of the network processor 100, such as between transfer registers 174 of the microengines 106 and shared resources (e.g., the memory device 112). The data buses include push buses and pull buses. Push buses are used to transfer data when a master device (e.g., a microengine transfer register) requests data to be read from the memory device 112. Pull buses are used to transfer data when a source (e.g., a microengine transfer register) requests data to be written to the memory device 112. The command buses transfer system commands, each system command notifying a shared resource that a microengine is requiring service. The commands are sent by master devices (e.g., microengines 106) to target devices that respond to the commands.

A system read command includes a read command code that indicates data is to be read from the memory device 112, a start address that indicates the start location in the memory device 112 where the data is read from, the length of the requested data transfer (e.g., the number of bursts of the data transfer), and a push identifier (push_ID) that identifies a destination device (e.g., a microengine transfer register) that is to receive the read data. A system write command includes a write command code that indicates data is to be written to the memory device 112, a start address that indicates the start location in the memory device 112 where the data is written to, the length of the requested data transfer (e.g., the number of bursts of the data transfer), and a pull identifier (pull_ID) that identifies a source (e.g., a microengine transfer register) that has the data to be written to the memory device 112.

In one example, a microengine 106 sends a system read command to a target device (e.g., the memory controller module 110) and the target device sends read data back to the destination master device (in this case, the microengine 106) on a push bus.

Memory Device

Referring to FIG. 3, in one example, the memory device 112 is a QDR SRAM device that supports burst-of-two data transfers. The memory interface 158 includes an input data bus 170 that is 18 bits wide and an output data bus 172 that is 18 bits wide. The QDR SRAM controller 140 is configured to generate memory read (or write) commands that each causes 36 bits of information (including 32 bits of data and 4 bits of parity code) to be read from (or written to) the memory device 112.

When a system read (or write) command requests 32 bits of data transfer, the QDR SRAM controller 140 sends one memory read (or write) command to the memory device 112. The QDR SRAM controller 140 includes a command issuer (not shown) that generates multiple memory read (or write) commands when a system read (or write) command requests more than 32 bits of data transfer. For example, if a system read (or write) command requests n×32 bits of data transfer, n being an integer, then the QDR SRAM controller 140 sends n memory read (or write) commands to the memory device 112. A system command can be split into multiple memory commands without data alignment problems because each system command requests a transfer of multiples of 4 bytes of data and each memory command causes a transfer of 4 bytes of data.

In another example, the memory device 112 is a low latency DRAM device that supports burst-of-four data transfers. Each memory read (or write) command sent to the memory device 112 causes 72 bits of information (including 64 bits of data and 8 bits of error correction code) to be read from (or written to) the memory device 112.

A system read (or write) command requests multiples of 32 bits of data to be read from (or written to) the memory device 112, whereas a memory read (or write) command causes 64 bits of data to be read from (or written to) the memory device 112. A system read (or write) command is un-aligned when it requests access to memory space that is not aligned along 8-byte boundaries of the low latency DRAM device.

The low latency DRAM controller 150 processes an un-aligned system read command by reading units of aligned 8-byte data, which includes the requested un-aligned data and redundant data, and discarding the redundant data. The controller 150 processes an un-aligned system write command by using a read-modify-write (R-M-W) process, in which the controller 150 reads units of aligned 8-byte data from the memory device 112, combines the aligned data with the un-aligned write data, and writes the combined aligned data to the memory device 112.

System Bus Interface Logic Circuit

Referring to FIG. 4, the system bus interface 154 includes a push bus 166, a command bus 182, a pull request bus 228, and a pull bus 168. In this example, the push bus 166 and pull bus 168 are each 32 bits wide, and the command bus 182 is more than 64 bits wide. The command bus transfers, for example, 32 bits of address, 8 bits of burst data, push_ID, pull_ID, and byte mask.

The system bus interface logic circuit 152 includes a command interface 180 to receive system commands from the command bus 182. Each system read (or write) command reads (or writes) multiples of 32 bits of data. For example, if a system read command requests a burst-of-two data transfer, 64 (32×2=64) bits of data are read from the memory device 112. If a system write command requests a burst-of-eight data transfer, then 256 (32×8=256) bits of data are written to the memory device 112. Each system read command includes a push_ID to identify a destination device which is to receive the read data, and each system write command includes a pull_ID to identify a source which has the write data.

The system commands are forwarded to a command first-in-first-out (FIFO) queue 184 that forwards the system commands to the low latency DRAM controller 150 through a signal bus 252. When the command interface 180 receives a system write command, the command interface 180 instructs pull request logic 224 to send a pull request to the pull request bus 228. The pull request includes the pull_ID, which identifies the source that has the write data. The pull request is sent to a system bus arbitration unit (not shown) that retrieves the write data from the source, and sends the write data to a pull data receiver 226 through the pull bus 168. The write data is sent to the low latency DRAM controller 150 through a signal bus 256.

When a system read command is forwarded from the command FIFO queue 184 to the memory controller 150, after a period of time, the memory controller 150 sends the read data and the push_ID to a push logic circuit 222 through a signal bus 254. The push logic circuit 222 pushes the read data to a destination device identified by the push_ID through the push bus 166.

Low Latency DRAM Controller

In the examples below, the low latency DRAM controller 150 is configured to control access to a low latency DRAM device that supports burst-of-four data transfers, each burst transferring 18 bits of information, resulting in 72 bits of information, e.g., 64 bits of data and 8 bits of error correction code. Each memory read (or write) command reads from (or writes to) the memory device 64 bits of data and 8 bits of error correction code.

Figure 5:
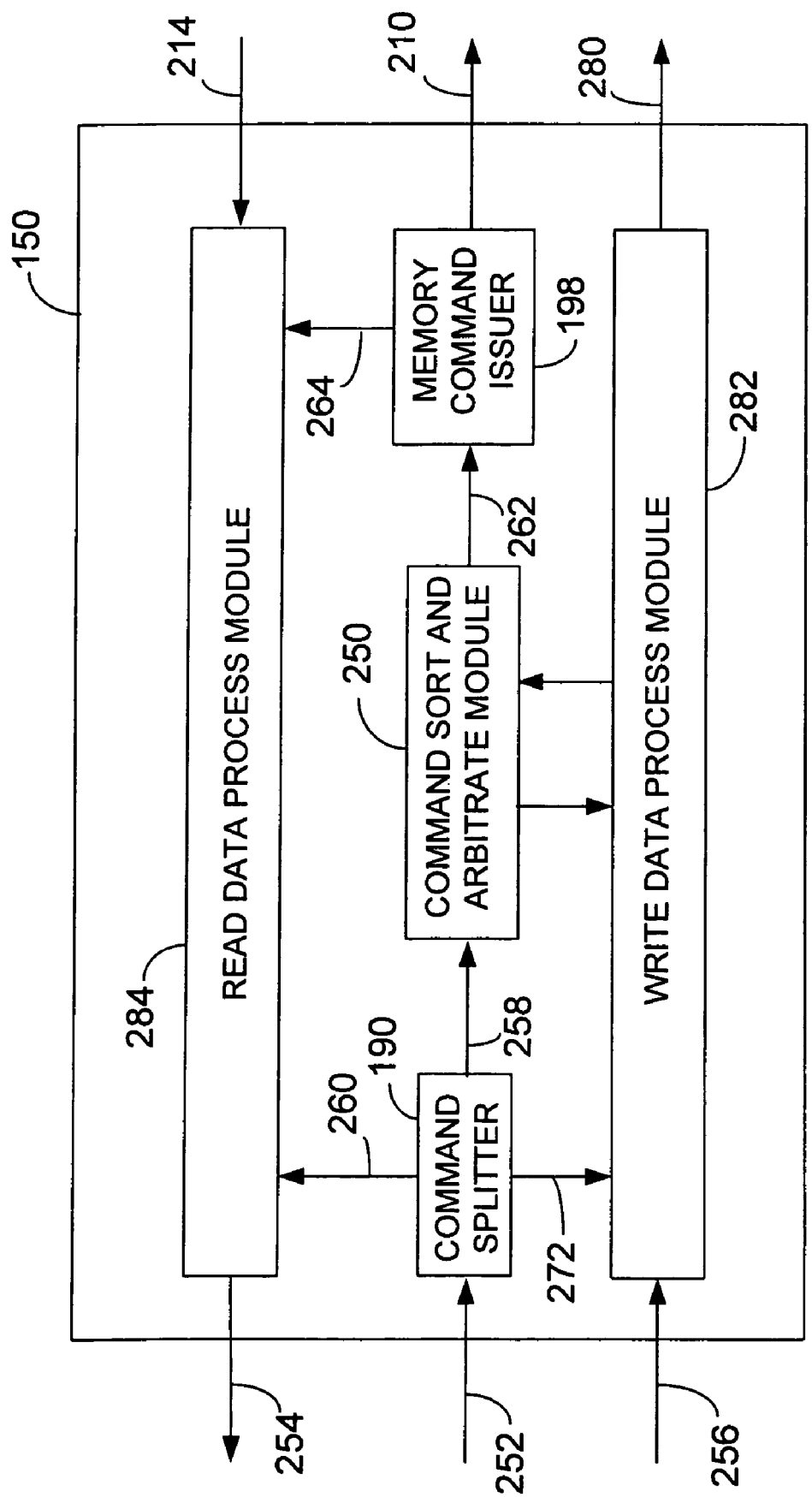
FIG. 5 shows a block diagram of the low latency DRAM controller.

Referring to FIG. 5, the low latency DRAM controller 150 includes a command splitter 190 that, for each system command, generates one or more memory commands to accomplish the request of the system command. When the system read or write command is un-aligned, the command splitter 190 ensures that the correct read data is retrieved from the memory device 112 and forwarded to the interface logic circuit 152, and that the write data is written to the correct addresses in the memory device 112.

The command splitter 190 splits a system command into multiple memory commands if the system command requests a transfer of data that is more than 64 bits (or 8 bytes). For example, if a system write command requests an aligned burst-of-four data transfer (which transfers 4×32 bits=16 bytes of data), two memory write commands are generated. If the system read command requests 16 bytes of data that are not aligned, then three memory read commands are generated.

Each memory read command includes a read command code that indicates data is to be read from the memory device 112, a push_ID (which is the same push_ID associated with the corresponding system read command) that identifies the destination device receiving the read data, and a start address identifying the start location where the data is to be read form the memory device 112. Each memory write command includes a write command code that indicates data is to be written to memory, a pull_ID (which is the same push_ID associated with the corresponding system write command) that identifies the source that has the write data, and a start address identifying the start location where the data is to be written to the memory device 112.

The command splitter 190 sends the memory commands to a command sort and arbitrate module 250 through a signal bus 258. Module 250 sorts the memory commands according to the memory bank being accessed, and arbitrates the order in which the memory commands are executed. Module 250 uses an arbitration scheme that reduces bank conflicts to increase bandwidth of access to the low latency DRAM device. The command sort and arbitrate module 250 includes different sub-modules (which uses different arbitration schemes) to process memory commands that are suitable for different categories of low latency DRAM devices (e.g., RLDRAM with separate I/O buses, RLDRRAM with a common I/O bus, and FCRAM devices).

Module 250 sends the memory commands to a memory command issuer 198 through a signal bus 262. The memory command issuer 198 issues the memory commands to the memory device 112 through a signal bus 210.

The command splitter 190 generates a tag (or an identifier) for each memory command. Because the module 250 may change the execution order of the memory commands, the tags are useful for re-ordering the read data received from the memory device 112, and for matching memory write commands with corresponding write data. The tags are attached to the memory commands as the memory commands are sent from the command splitter 190 to the module 250 (through the signal bus 258) and to the memory command issuer 198 (through the signal bus 262).

For memory read commands, the command splitter 190 sends the tags to a read data process module 284 through a signal bus 260, and the memory command issuer 198 sends the tags to the read data process module 284 through a signal bus 264. The tags on signal bus 260 has an order that is the same as the memory read commands on the signal bus 258 (which is before arbitration by the module 250), and the tags on the signal bus 264 has an order that is the same as the memory read commands on the signal bus 262 (which is after arbitration by the module 250).

The read data processing module 150 receives read data on a signal bus 214, and attaches the tags from the signal bus 264 to the read data. Because the module 250 may have re-arranged the order of the memory read commands, the read data on signal bus 214 may not be in the correct order. The read data process module 150 matches the tags attached to the read data with tags from the signal bus 260, re-orders the read data in the proper sequence, and outputs the read data on the signal bus 254.

The tags provide information on which read data corresponds to the last burst of data requested by the system read command. When a system read command requests 64 bytes of read data, the tags provide information on which 8-byte read data is the last 8 of the 64 bytes of read data. The tags also provide information to allow the memory controller 150 to identify which portion of the data read from the memory device 112 is redundant, and should be discarded before sending the read data to the push bus 166 (this occurs when the system read command requests un-aligned read data).

In a write operation, the tags provide information to allow memory write commands to be matched with corresponding write data to ensure that the write data are written to the correct addresses in the memory device 112. When a system write command requests access to an un-aligned memory space, a write data processing module 282 aligns the write data by performing a read-modify-write operation.

Aligned and Un-aligned System Commands

The following describes how the low latency DRAM memory controller 150 processes aligned system commands and un-aligned system commands.

Because each read (or write) command causes 8 bytes of data to be transferred from (or to) the low latency DRAM device 112, the memory space of the low latency DRAM device is divided into 8-byte units. For example, the first 8-byte unit may have addresses 0x0000 to 0x0007, the second 8-byte unit may have addresses 0x0008 to 0x000F, and the third 8-byte unit may have addresses 0x0010 to 0x0017, and so forth. In the example above, a unit of data is referred to as being aligned along the 8-byte memory boundaries if the unit of data has a start address 8×m, and an end address (8×n+7), where m and n are integers.

When a system command requests an aligned data transfer having a size of p×8 bytes, the command splitter generates p memory commands that are sent to the low latency DRAM device. When a system command requests a non-aligned data transfer having a size of p×8 bytes, the command splitter generates p+1 memory commands.

In an example of an aligned system command, the system command requests a burst-of-four data transfer starting at address 0x0000 (which accesses 16 bytes of data at addresses 0x0000 to 0x000F). Because the memory space is aligned along the predetermined memory space boundaries, the command splitter 190 generates two memory commands, the first memory command accessing addresses 0x0000 to 0x0007, the second memory command accessing addresses 0x0008 to 0x000F.

In an example of a non-aligned system command, the system command requests a burst-of-four data transfer starting at address 0x0004 (which accesses 16 bytes of data at addresses 0x0004 to 0x0013). Because the memory space is not aligned along the predetermined memory space boundaries, the command splitter 190 generates three memory commands, the first memory command accessing addresses 0x0000 to 0x0007, the second memory command accessing addresses 0x0008 to 0x000F, and the third memory command accessing addresses 0x0010 to 0x0017. The memory controller 150 discards the data from the addresses 0x0000 to 0x0003 and 0x0014 to 0x0017 before sending the read data to the push bus 166.

In another example of a non-aligned system command, the system command requests a burst-of-one data transfer, starting at address 0x0004 (which accesses 4 bytes of data at addresses 0x0004 to 0x0007). The command splitter 190 generates one memory command that accesses addresses 0x0000 to 0x0007. The memory controller 150 later discards the data from addresses 0x0000 to 0x0003 before sending the read data to the push bus 166.

Arbitration of Memory Commands

The following describes arbitration of the memory commands to increase bandwidth of access to the low latency DRAM device.

Figure 6:
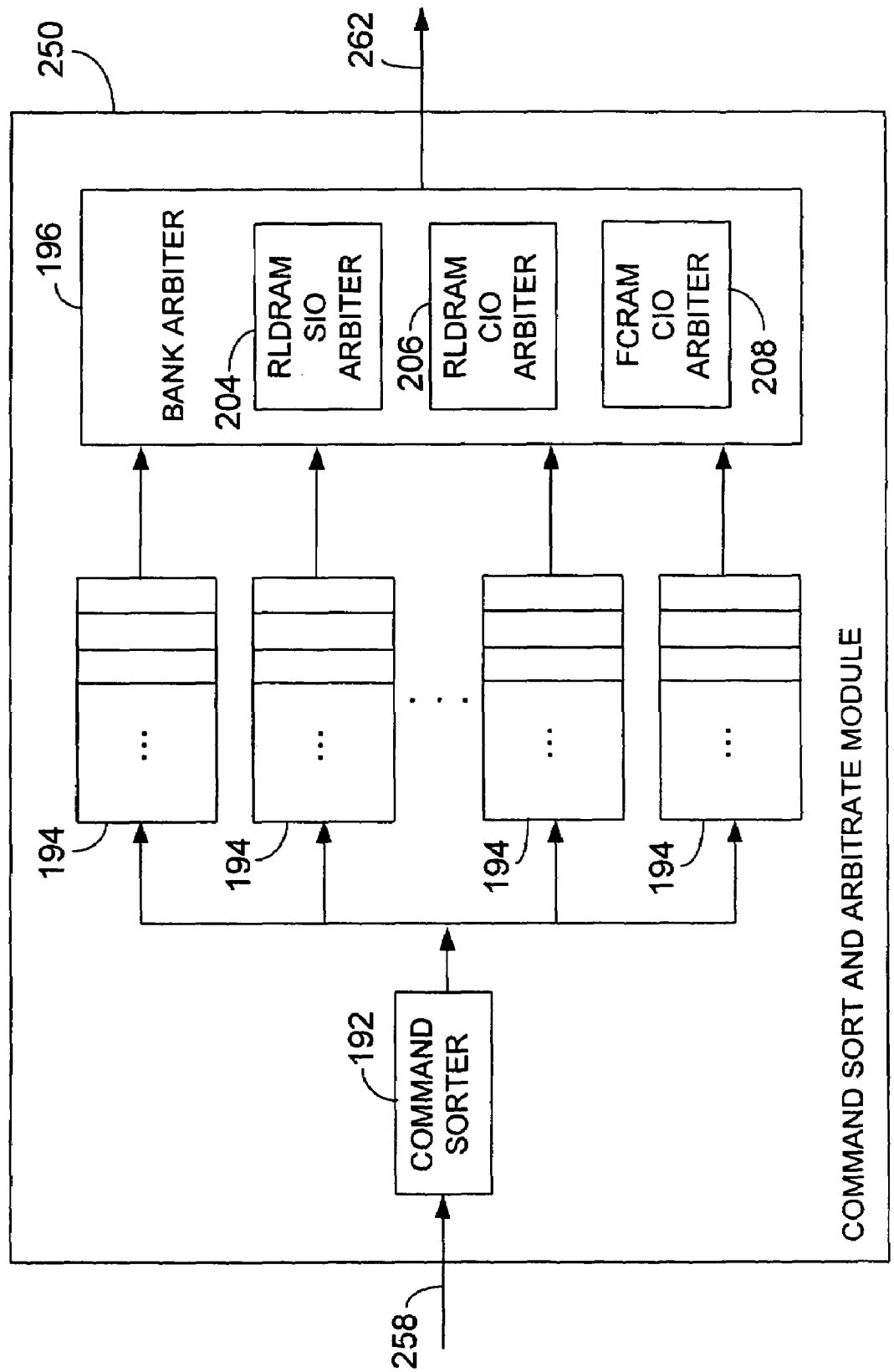
FIG. 6 shows a block diagram of a command sort and arbitrate module.

Referring to FIG. 6, in one example, the low latency DRAM device includes eight memory banks that allow random access within each memory bank. The command sort and arbitrate module 250 includes eight bank FIFO queues 194 (each corresponding to one memory bank) that are used to store memory commands and tags intended for the corresponding memory bank.

A command sorter 192 receives memory commands (and associated tags) on the signal bus 258, and sorts and distributes the memory commands (and tags) to the bank FIFO queues 194. The command sorter 192 sorts the memory commands based on which address the command is accessing and the type of memory device 112. If the memory device 112 is an FCRAM device that has only four memory banks, then the command sorter 192 sorts and distributes the memory commands to the first four of the bank FIFO queues 194.

To provide efficient access to the different memory banks, a bank arbiter 196 arbitrates the order in which the memory commands in different bank FIFO queues 194 are sent to the low latency DRAM device so as to reduce bank conflicts. In this example, the bank arbiter 196 includes an RLDRAM SIO arbiter 204, an RLDRAM CIO arbiter 206, and an FCRAM CIO arbiter 208, which are used when the memory device 112 is an RLDRAM device having separate input/output data buses, an RLDRAM device having a common input/output data bus, and an FCRAM device having a common input/output data bus, respectively. The three categories of memory devices (RLDRAM single input/output, RLDRAM common input/output, and FCRAM common input/output) have different burst lengths and interface pins, so different arbitration algorithms are used to increase the bandwidth of access to the different types of memory devices.

The bank arbiter 196 chooses a memory read command or a memory write command from the 8 bank FIFO queues 194 in each cycle. The bank arbiter 196 takes account of the row cycle time of the low latency DRAM device, so that a chosen bank FIFO queue will not be chosen again for a duration equal to the row cycle time, since the corresponding memory bank will not be available during that period. The bank arbiter 196 may take account of other factors.

When using a low latency DRAM device that has separate input and output data buses, memory read commands and memory write commands can be interleaved and executed out of order to increase utilization of the data input and output buses.

Figure 7:
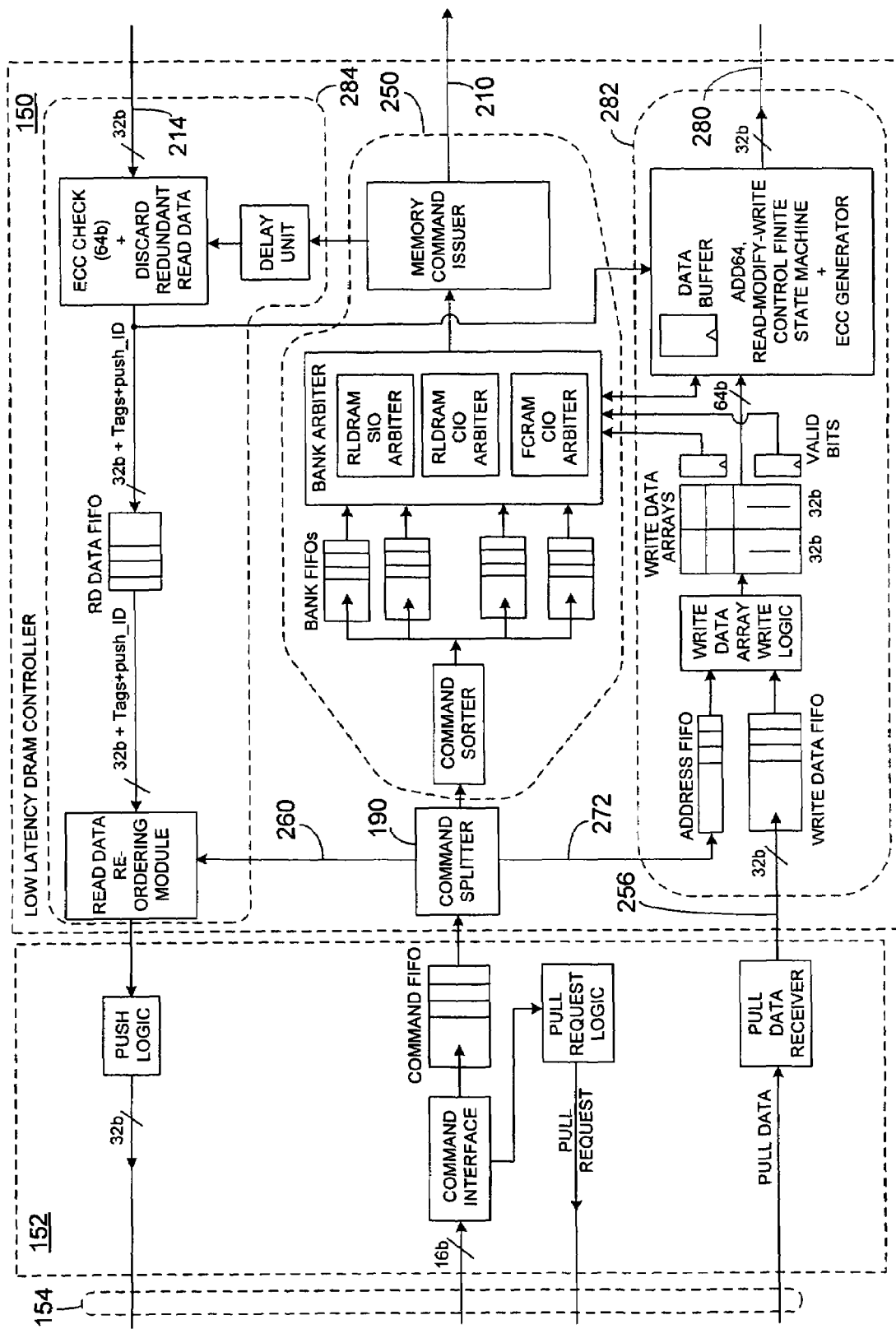
FIG. 7 shows a block diagram of the system bus interface logic circuit and the low latency DRAM controller.
Figure 8:
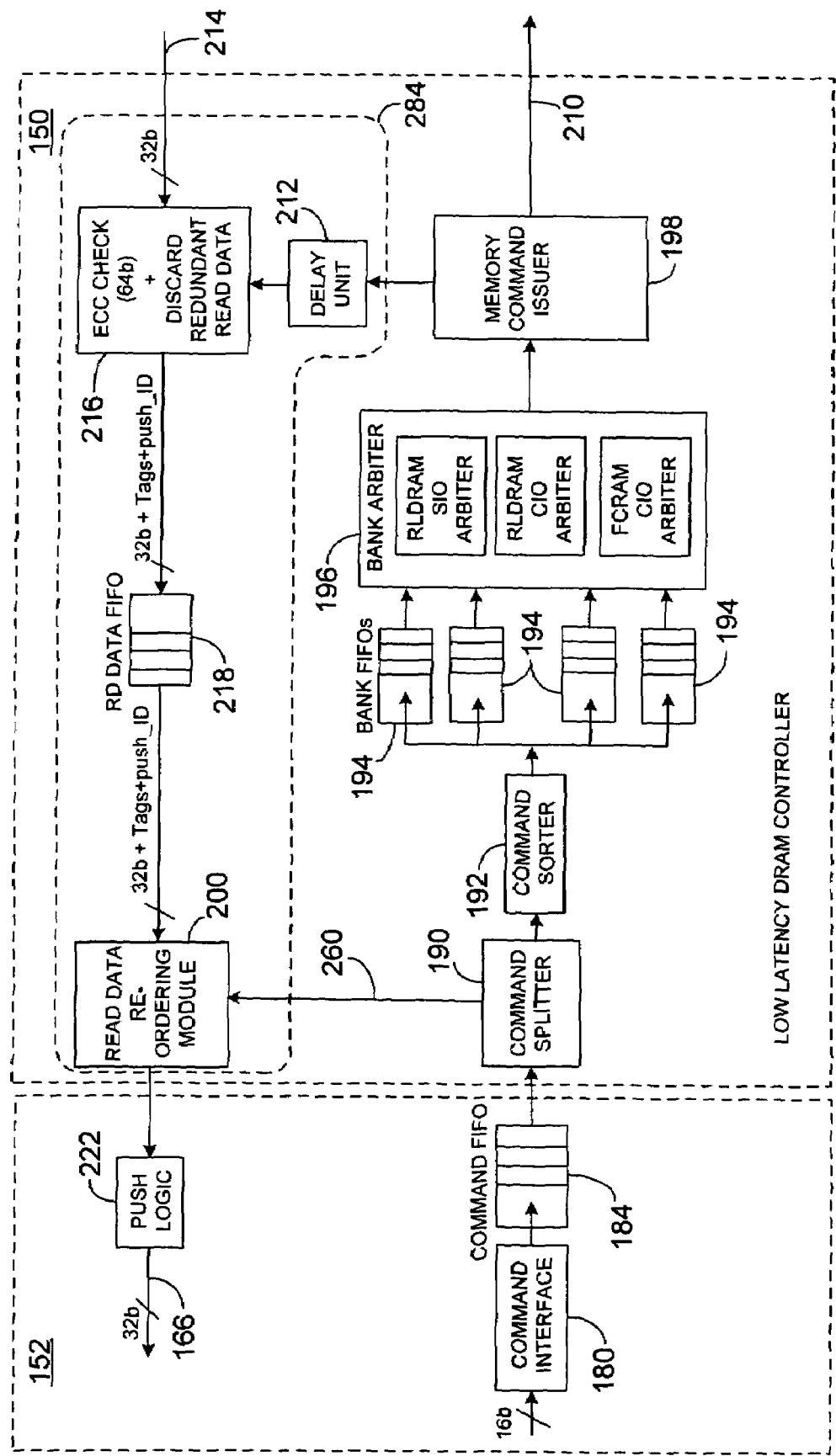
FIG. 8 shows a block diagram of modules for processing memory read commands.

FIGS. 7 and 8 show the low latency DRAM controller 150 and the system bus interface logic circuit 152.

A memory read command generated by the command splitter 190 includes a read command code, a tag, a push_ID, and a start address. When the command issuer 198 receives a memory read command from the bank arbiter 196, the command issuer 198 sends the read command code and the start address to the signal bus 210 that is coupled to the pin multiplexer 164 (FIG. 2), and sends the push_ID and the tag to a programmable delay unit 212. The pin multiplexer 164 forwards the read command code and the start address to the double data rate module 156, which accesses the memory device 112 through the memory interface 158. In response, the memory device 112 outputs the requested read data and error correction code after a specified delay period.

The read data and error correction code are sent to the memory controller 150 through the signal bus 214 that is coupled to an error correction code (ECC) check and redundant data discard module 216. Module 216 checks the error correction code to determine if there is an error in the read data, and attempts to fix the error if an error is found.

The delay unit 212 forwards the push_ID and the tag to the module 216 that attaches the push_ID and the tag to the read data received from signal bus 214. The delay unit 212 delays the push_ID and the tag for an amount of time that is similar to the amount of time it takes for the read data and the error correction code to appear on the signal bus 214, so that the push_ID and the tag can be matched with the correct read data. The delay period is programmable through a register (not shown) in the delay unit 212. The amount of time that the push_ID and the tag are delayed depends on the category of memory device being used, since different memory devices have different memory latencies.

The tags provide information on whether the read data contains redundant data. For example, when a system read command requests un-aligned read data at addresses 0x0004 to 0x000B, two memory read commands are issued, the first memory read command requesting data from 0x0000 to 0x0007, and the second memory read command requesting data from 0x0008 to 0x000F. The first tag (corresponding to the first memory read command) indicates that the first four bytes (0x0000 to 0x0003) should be discarded from the first 8 bytes of read data. The second tag (corresponding to the second memory read command) indicates that the last four bytes (0x000C to 0x000F) should be discarded from the second 8 bytes of read data.

The module 216 sends the read data, the push_IDs, and the tags to a read data FIFO queue 218, which forwards the read data, the push_IDs, and the tags to a read data re-ordering module 200. The re-ordering module 200 has a list that stores a set of tags sent from the command splitter 190 through the signal bus 260. The set of the tags has an order that is the same as the order in which the memory read commands were sent to the command sorter 192 (which is prior to the memory read commands being arbitrated by the bank arbiter 196).

As an example, when a system read command requests data from addresses 0x0000 to 0x001F, the bank arbiter 196 may issue the memory read commands so that four units of data are returned from the memory device 122 in a sequence in which the first unit of data is from addresses 0x0018 to 0x001F, the second unit of data is from addresses 0x0000 to 0x0007, the third unit of data is from addresses 0x0010 to 0x0017, and the third unit of address is from 0x0008 to 0x000F.

The read data re-ordering module 200 re-orders the sequence of the read data received from the read data FIFO queue 218 until the corresponding tags match the set of tags received from the signal bus 260. The tags also identify the end-of-burst, or the last read data that corresponds to a system read command. In the above example, the tags attached to the read data stored in the read data FIFO queue 218 indicate that the first, second, third, and fourth units of read data should be rearranged as the fourth, first, third, and second units of data, respectively. After the re-ordering module 220 re-arranges the order of the read data that corresponds to a particular system read command, the re-ordering module 220 forwards the read data and the push_ID to the push logic circuit 222. The push logic circuit 222 sends the read data and the push_ID to the push bus 166, which forwards the read data to a destination device identified by the push_ID. In this way, even though the bank arbiter 196 changes the order of the memory read commands, the read data that is transferred out of the low latency DRAM controller 150 will still have the correct order.

Figure 9:
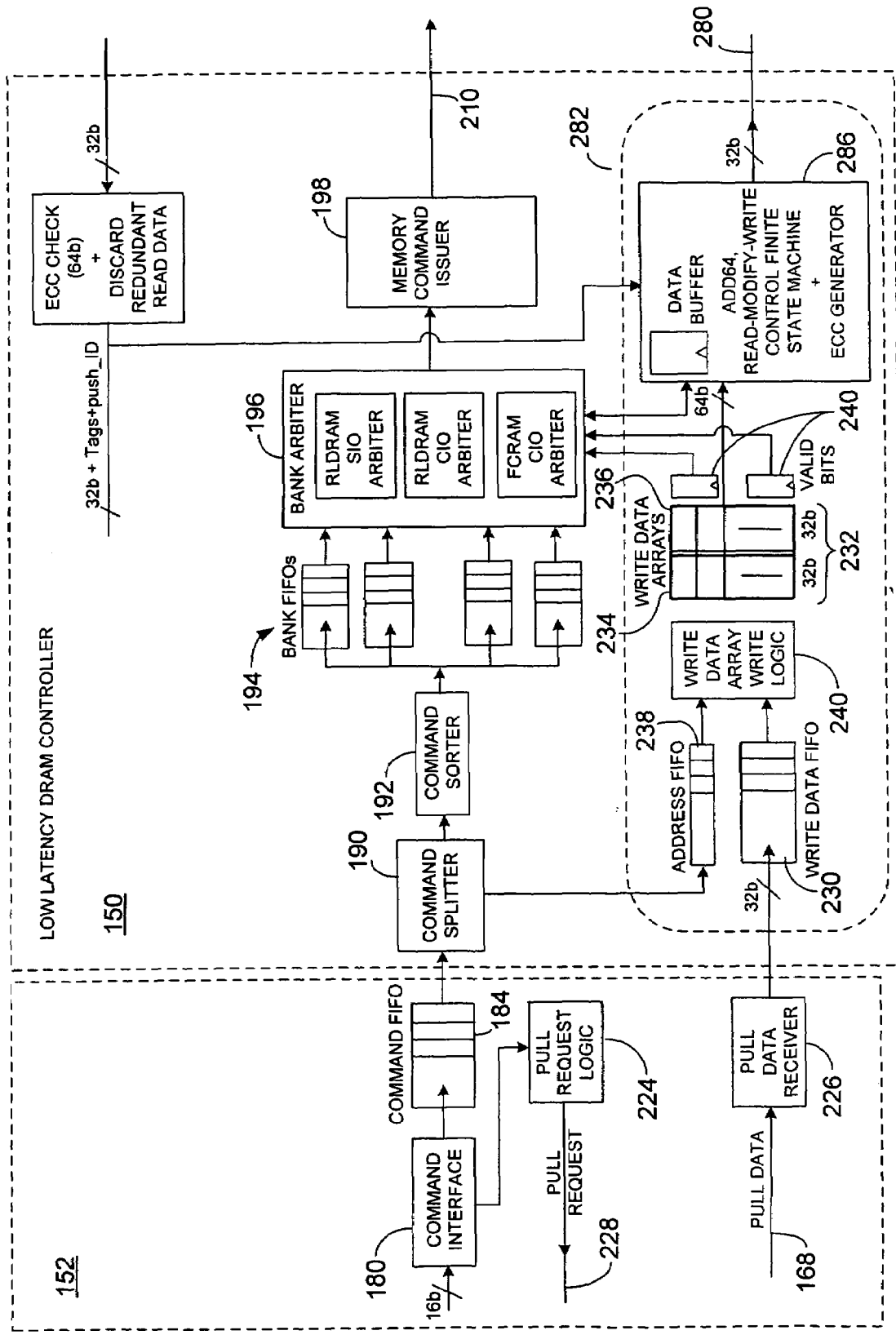
FIG. 9 shows a block diagram of modules for processing memory write commands.

Referring to FIGS. 7 and 9, a memory write command includes a write command code, a pull_ID, and a start address. When the command interface 180 receives a system write command, the command interface 180 instructs the pull request logic 224 to send a pull request to a pull request bus 228. After a period time, the pull data receiver receives the write data from the pull bus 168, and sends the write data to a write data FIFO queue 230.

Each system write command writes multiples of 4 bytes of write data. Because each memory write command writes 8 bytes of data to the low latency DRAM device, the write data process module 282 aligns the write data along 8-byte memory boundaries of the low latency DRAM device.

Figure 10:
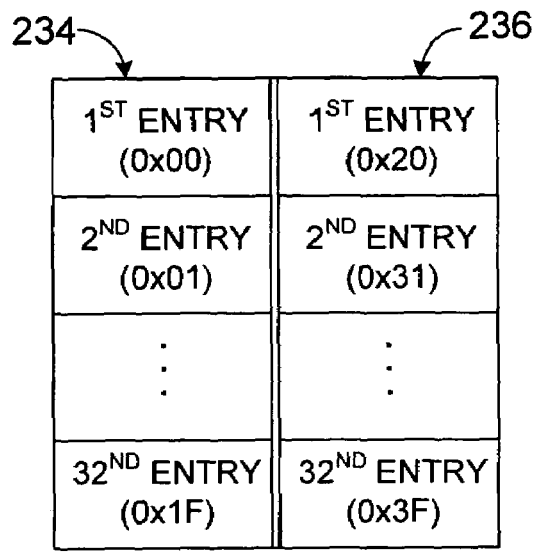
FIG. 10 shows write data arrays.

The write data process module 282 includes two banks of write data arrays 234 and 236 (collectively 232). Each array has 32 entries, and each entry is configured to store 32 bits of write data (see FIG. 10). As an example, the entries of the write data array 234 have addresses 0x00 to 0x1F, and the entries of the write data array 236 have addresses 0x20 to 0x3F.

For each 4 bytes of write data, the command splitter 190 obtains the address of a free entry (i.e., an entry that is empty) from the write data array 234 or 236. If the 4-byte write data is to be written into the memory device 112 with a start address of 8×n, n being an integer, the command splitter 190 obtains the address of a free entry from the write data array 234. If the 4-byte write data is to be written into the memory device 112 with a start address of 8×n+4, the command splitter 190 obtains the address of a free entry from the write data array 236. The write data array 234 stores write data that correspond to the first 4 bytes of an aligned 8-byte unit in the memory device 112, and the write data array 236 stores write data that correspond to the second 4 bytes of an aligned 8-byte unit in the memory device 112.

The command splitter 190 generates tags that include the addresses of the free entries, and sends the tags to an address FIFO queue 238. A write data array write logic circuit 240 retrieves the 4-byte write data and the tags from the write data FIFO queue 230 and the address FIFO queue 238, respectively. The circuit 240 writes the 4-byte write data into the write data arrays 232 according to the addresses in the tags.

If a system write command writes a 8-byte data that is aligned, the command splitter 190 will obtain an address of a free entry from each of write data arrays 234 and 236, in which the two addresses will correspond to the same entry numbers, such as the i-th entry of array 234 and the i-th entry of array 236. If a system write command writes a 8-byte data that is not aligned, the command splitter 190 will obtain an address of a free entry from each of write data arrays 234 and 236, but the two addresses will correspond to different entry numbers, such as the i-th entry of array 236 and the (i+1)th entry of array 234.

The command splitter generates two kinds of memory write commands. The first kind of memory write command includes a write command code that indicates it does not need a read-modify-write operation. The corresponding write data is aligned, i.e., is a 8-byte unit aligned along 8-byte memory boundaries. The second kind of memory write command has a write command code that indicates it needs a read-modify-write operation. The corresponding write data is un-aligned, i.e., it can be the first 4 bytes of a 8-byte aligned unit or the second 4 bytes of a 8-byte aligned unit. The read-modify-write operation is described below.

Figure 11:
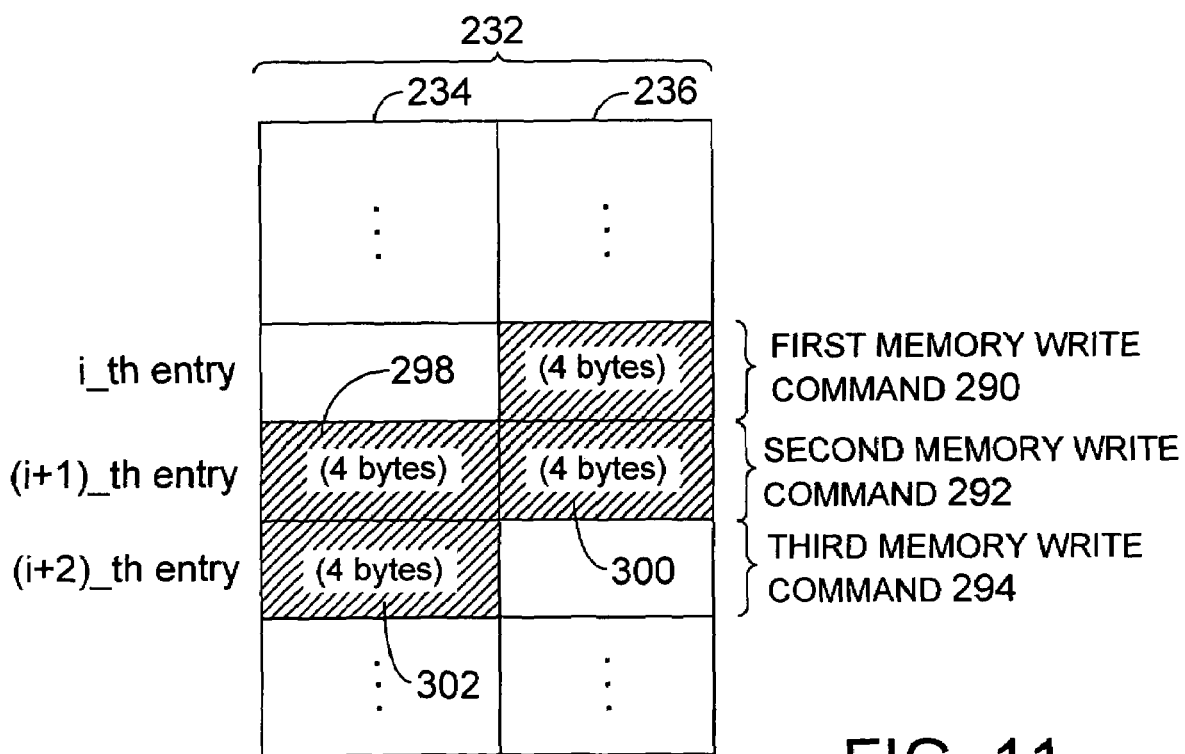
FIG. 11 shows the write data arrays storing an un-aligned unit of write data.

As an example, referring to FIG. 11, the system write command writes a 16-byte data to addresses 0x0004 to 0x0014 in the memory device 112. The 16 bytes of data is divided into four 4-byte units 296, 298, 300, and 302. The 4-byte write data units 296, 298, 300, and 302 may be stored in the i-th entry of write data array 236, the (i+1)th entry of write data array 234, the (i+1)th entry of write data array 236, the (i+2)th entry of write data array 234, respectively.

In response to the system write command, the command splitter 190 generates three memory write commands. The first memory write command 290 writes the 4-byte write data stored in the i-th entry of write data array 236. The second memory write command 292 writes the 8-byte write data stored in the (i+1)th entries of write data arrays 234 and 236. The third memory write command 294 writes the 4-byte write data stored in the (i+2)th entry of write data array 234.

Each pair of corresponding entries of the write data arrays 234 and 236 is associated with a register 240 that stores a valid bit to indicate whether write data is stored in the pair of entries and ready to be transferred to the memory device 112.

The command splitter 190 sends the memory write commands and the corresponding tags to the command sorter 194, which forwards the memory write commands and the tags to the bank FIFO queues 194. The bank arbiter 196 arbitrates memory write commands based in part on the readiness of the write data in the write data arrays 232. When the bank arbiter 196 decides whether a particular memory write command should be sent to the command issuer 198, the bank arbiter 196 looks up the write data array address in the tag to determine which pair of entries of the data arrays 232 hold the corresponding write data.

The bank arbiter 196 detects the valid bit in the register 240 associated with the pair of entries to determine whether the write data is ready. If the write data is not ready, the bank arbiter 196 looks for the next command based on the arbitration algorithm. If the write data is ready, there are two situations:

Situation 1: The memory write command has a write command code indicating that it does not need a read-modify-write operation. For example, the second memory write command 292 writes the 4-byte units 298 and 300, which in combination form an aligned 8-byte write data, and thus does not need a read-modify-write operation. The bank arbiter 196 instructs a read-modify-write finite state machine and ECC generation module 286 (referred to as the R-M-W and ECC module 286) to read the 8-byte write data from the (i+1)th entries of the write data arrays 234 and 236. Module 286 generates an 8-bit error correction code for the 8-byte write data. The second memory write command 292 is sent to signal bus 210, and the 8-byte write data and the 8-bit ECC are sent to the signal bus 280.

Situation 2: The memory write command has a write command code indicating that it requires a read-modify-write operation. For example, the first memory write command 290 writes the 4-byte unit 296, which is not aligned, and thus needs a read-modify-write operation. The bank arbiter 196 instructs the R-M-W and ECC module 286 to read a 8-byte aligned data from the memory device 112 at addresses corresponding to the 4-byte unit 296. In this case, the 4-byte unit 296 is to be written to addresses 0x0004 to 0x0007, so the 8-byte aligned data is read from addresses 0x0000 to 0x0007.

The R-M-W and ECC module 286 reads the 4-byte unit 296 from the i-th entry of write data array 236, combines the 4-byte unit 296 with the 8-byte aligned data (read from addresses 0x0000 to 0x0007) to generate a combined 8-byte write data that is aligned. Module 286 generates an 8-bit error correction code for the 8-byte combined data. The first memory write command 290 is sent to the signal bus 210, and the 8-byte combined write data and the 8-bit ECC are sent to the signal bus 280.

During the time that the R-M-W and ECC module 286 is busy processing a memory write command associated with a particular memory bank, the corresponding bank FIFO queue 194 is stalled so that no other commands are serviced from that bank FIFO queue 194.

By using the technique described above to process the system commands and memory commands, the memory controller module 110 can control access to a QDR SRAM device or a low latency DRAM device, where the QDR SRAM device supports burst-of-two data transfers, while the low latency DRAM device supports burst-of-four data transfers. The memory controller module 110 selects the appropriate memory controller (140 or 150) based on whether a QDR SRAM device or a low latency DRAM device is used, and performs the appropriate data alignment when necessary.

Figure 12:
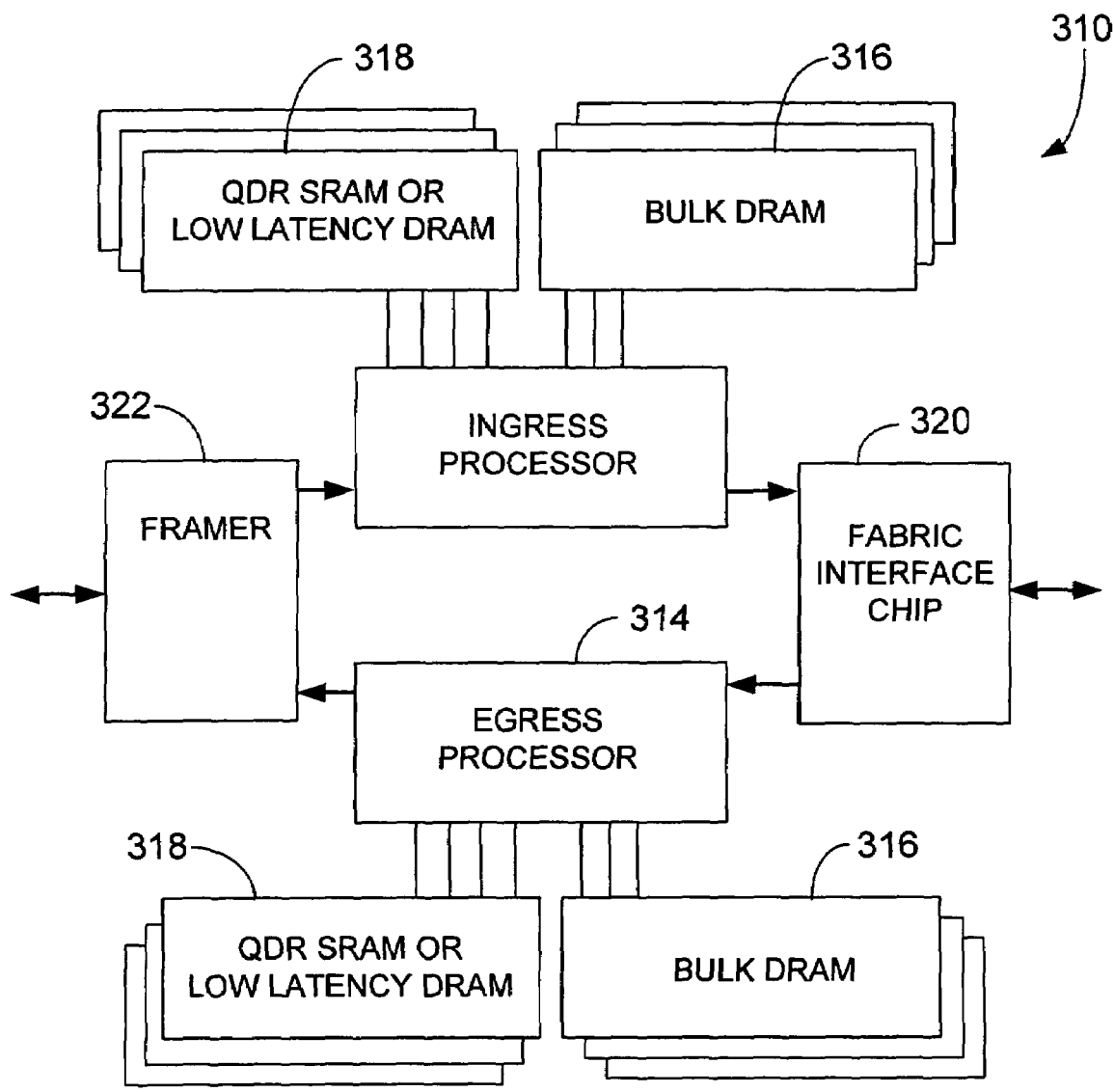
FIG. 12 shows a block diagram of an Ethernet switch blade that includes the network processor of FIG. 1.

Referring to FIG. 12, an example of a 10-gigabit Ethernet switch blade 310 includes a network processor 312 for ingress processing and a network processor 314 for egress processing. Ingress processing tasks may include classification, metering, policing, congestion avoidance, statistics, segmentation, and traffic scheduling into a switch fabric. Egress processing tasks may include reassembly, congestion avoidance, statistics, and traffic shaping. Input and output buffering are supported using buffers in bulk DRAM devices 316 (such as Rambus™ DRAM devices) linked together by linked lists maintained in high speed memory devices 318, such as QDR SRAM devices or low latency DRAM devices.

The ingress and egress network processors 312 and 314 each has one or more memory controller modules 110 that can control access to different categories of high speed memory devices, such as QDR SRAM, RLDRAM, or FCRAM devices, providing flexibility to the user.

The ingress and egress network processors 312 and 314 present a full-duplex interface to a switch fabric through a fabric interface chip 320. Packets are streamed into the ingress network processor 312 at or above line rate. The packets are received, reassembled, processed, buffered into the DRAM devices 316, and enqueued for transmission into the switch fabric. Similarly, the egress network processor 314 receives packets from the fabric interface chip 320, reassembles, processes, and buffers the packets in the DRAM devices 316, and queues the packets for outgoing transmission through an egress framer 322.

Although some examples have been discussed above, other implementations and applications are also within the scope of the following claims. For example, the memory controller module 110 can be used to control access to categories of memory devices different from what was described. RLDRAM devices can include RLDRAM I and RLDRAM II devices.

The memory controller module 110 can have three or more memory controllers configured to control three or more different categories of memory devices. The pin multiplexer 164 couples the output pins of one of the three or more memory controllers to the memory device 112 (through the double data rate module 156). In an alternative example, two or more memory devices are used, and a subset of the three or more memory controllers are used to control access to the two or more memory devices. The pin multiplexer 164 couples the output pins of the subset of the three or more memory controllers to the corresponding memory devices.

In FIG. 4, the push bus 166 and pull bus 168 can have different bit widths. In FIG. 3, the data input bus 170 and data output bus 172 can have different bit widths. The memory device 112 can support different burst modes (e.g., burst-of-six or burst-of-eight data transfers). Predefined memory boundaries can be different what was described. Various error correction codes may be used, such as linear block codes, Hamming codes, or convolutional codes.

In FIG. 1, the network processor 100 can have more than one memory controller module 110. For example, the processor 100 can have four memory controller modules 110 to control access to high speed memory devices. The four memory controller modules 110 allow access to four independent memory channels to provide a higher control information bandwidth. The network processor as bulk DRAM controllers for controlling bulk DRAM devices (such as synchronous DRAM or Rambus DRAM devices), cryptography units to perform authentication and encryption, a hash unit to implement hash functions to detect collisions, and a PCI unit to provide an interface to a PCI data bus, and so forth.

The low latency DRAM controller 150 can support more than one (e.g., four) read-modify-write finite state machines that can concurrently perform 4 unaligned writes that are scheduled from 4 out of the 8 bank FIFO queues 194. To reduce the die size and complexity of the controller, each R-M-W finite state machine can have a mechanism to block subsequent entries from that bank FIFO queue so that ordering is maintained between commands in the same bank FIFO queue.

What is claimed is:

1. An apparatus comprising:
   a memory interface;
   a static random access memory (SRAM) controller;
   a dynamic random access memory (DRAM) controller; and
   a multiplexer to forward commands from either the SRAM controller or the DRAM controller to the memory interface based on information indicating whether an SRAM device or a DRAM device is coupled to the memory interface, the multiplexer comprising a pin multiplexer to map signal lines from either the SRAM controller or the DRAM controller to signal lines of the memory interface to allow either the SRAM controller or the DRAM controller to control access to the memory device based on the information indicating whether the SRAM device or the DRAM device is coupled to the memory interface.

2. The apparatus of claim 1, further comprising a system bus interface circuit to forward commands from a system bus to either the SRAM controller or the DRAM controller based on information indicating whether the SRAM device or the DRAM device is coupled to the memory interface.

3. The apparatus of claim 1, wherein the SRAM device comprises a quad-data-rate SRAM (QDR SRAM) device.

4. The apparatus of claim 1, wherein the DRAM device comprises a reduced latency DRAM (RLDRAM) device.

5. The apparatus of claim 1, wherein the DRAM device comprises a fast cycle RAM (FCRAM) device.

6. An apparatus comprising:
   a memory interface;
   at least two memory controllers, each to control a category of memory devices; and
   circuitry to selectively enable the at least two memory controllers to control access to memory devices based on information indicating the category or categories of the memory device coupled to the memory interface; and
   a pin multiplexer to couple signal lines of the memory interface to signal lines of the memory controller(s) that are enabled to allow the memory controller(s) to control the one or more memory devices coupled to the memory interface.

7. The apparatus of claim 6, further comprising circuitry to couple a subset of the at least two memory controllers to a system bus interface circuit based on the information indicating the category or categories of the memory device or devices coupled to the memory interface.

8. The apparatus of claim 6, wherein different categories of memory devices have different timing requirements for access of data.

9. The apparatus of claim 6, wherein different categories of memory devices have different pin assignments.

10. An apparatus comprising:
    a memory interface;
    at least two memory controllers, each to control a category of memory devices; and
    circuitry to selectively enable the at least two memory controllers to control access to memory devices based on information indicating the category or categories of the memory device coupled to the memory interface;
    wherein at least one of the memory controllers comprises:
    a command splitter to receive commands requesting access to at least one of the memory devices, and for each of one or more of the commands, the command splitter generates one or more sub-commands to access the memory device, the number of sub-commands depending on the size of a memory space accessed by the command, the command splitter also generating identifiers each associated with one of the sub-commands; and
    an arbiter to schedule the order in which the sub-commands are sent to the memory device.

11. The apparatus of claim 10, wherein the memory device comprises multiple memory banks.

12. The apparatus of claim 10, wherein the commands comprise read commands that read data from the memory device.

13. The apparatus of claim 12, wherein the memory controller comprises a first circuit to associate the identifiers with units of read data after the read data are read from the memory device.

14. The apparatus of claim 13, wherein the first circuit waits for a period of time after a command is issued to the memory device before the circuit associates the identifiers with the units of data read.

15. The apparatus of claim 14, wherein the period of time depends on category information of the memory device.

16. The apparatus of claim 13, wherein the memory controller comprises a second circuit to re-order the units of read data using the identifiers associated with the units of read data.

17. The apparatus of claim 16, wherein the second circuit re-orders the units of data based on an order of the sub-commands that requested the units of read data before the order of the sub-commands are changed by the arbiter.

18. The apparatus of claim 10, wherein the commands comprise write commands that write data to the memory device.

19. The apparatus of claim 18, wherein the memory controller comprises a storage to store information about which units of data are ready to be written to the memory device.

20. The apparatus of claim 19, wherein the arbiter schedules the sub-commands that request units of data to be written to the memory device based in part on the information about which units of data are ready to be written into the memory device.

21. The apparatus of claim 10, wherein the arbiter comprises at least one of a reduced latency DRAM (RLDRAM) separate input/output arbiter, an RLDRAM common input/output arbiter, and a fast cycle DRAM (FCRAM) arbiter, the RLDRAM separate input/output arbiter to schedule sub-commands to be sent to an RLDRAM device having separate input and output data buses, the RLDRAM common input/output arbiter to schedule sub-commands to be sent to an RLDRAM device having a common input and output data bus, and the FCRAM arbiter to schedule sub-commands to be sent to an FCRAM device.

22. The apparatus of claim 10, wherein the sub-commands access the memory device along predetermined memory space boundaries.

23. The apparatus of claim 22, wherein when a command requests access to a memory space that does not align with the predetermined memory space boundaries, the command splitter generates sub-commands to access a larger memory space that is aligned along the predetermined memory space boundaries and includes the memory space requested to be accessed by the command.

24. The apparatus of claim 22, wherein the memory controller comprises a read-modify-write unit to read a unit of aligned data from the memory device, the aligned data being aligned along the predetermined memory space boundaries, combine the unit of aligned data with a unit of write data that is not aligned along the predetermined memory space boundaries, and write the combined data to the memory device.

* * * * *